R. E. HELLMUND.
SYSTEM OF CONTROL.
APPLICATION FILED AUG. 10, 1915.
1,287,687.
Patented Dec. 17, 1918.
3 SHEETS—SHEET 3.
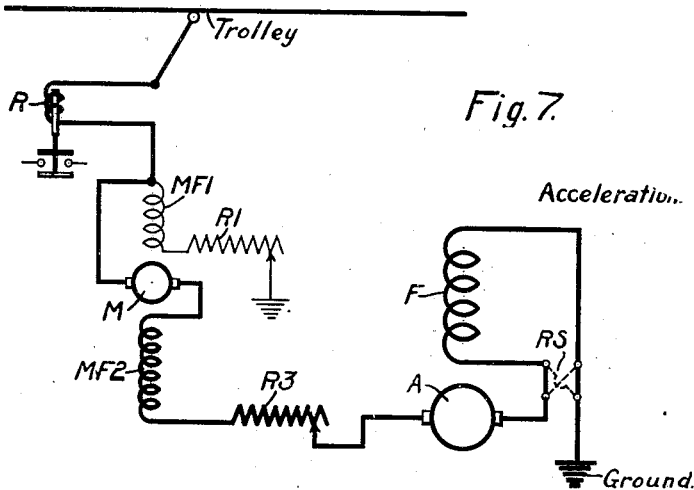
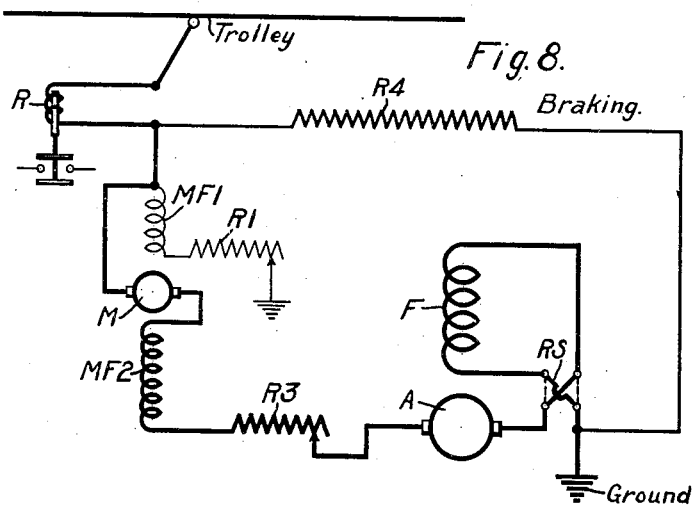
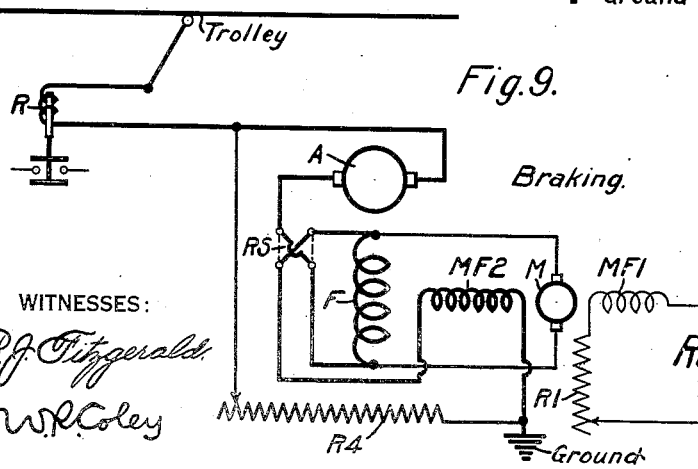
WITNESSES:
R. J. Fitzgerald
W. R. Coley
INVENTOR
Rudolf E. Hellmund.
BY Wesley G. Carr
ATTORNEY

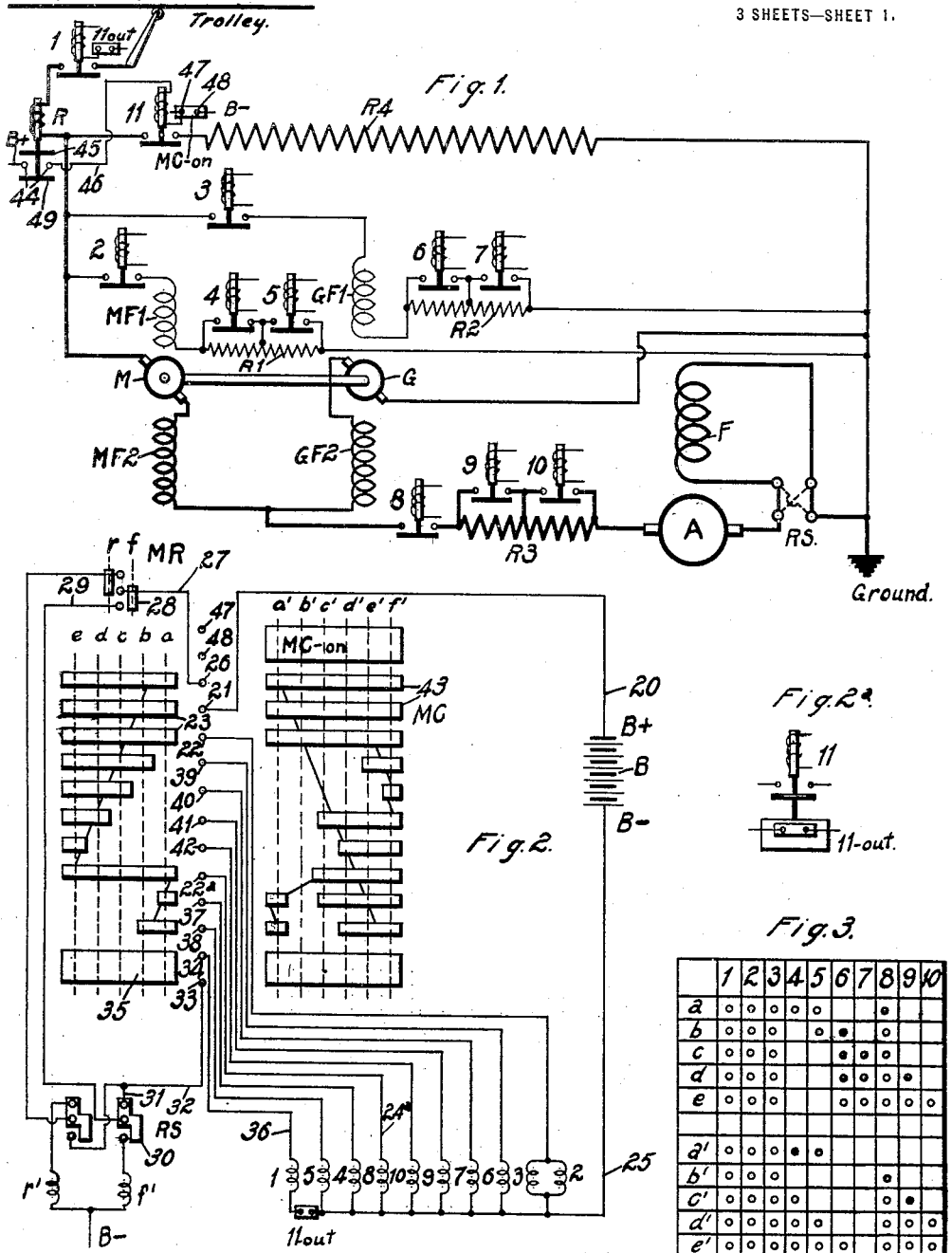

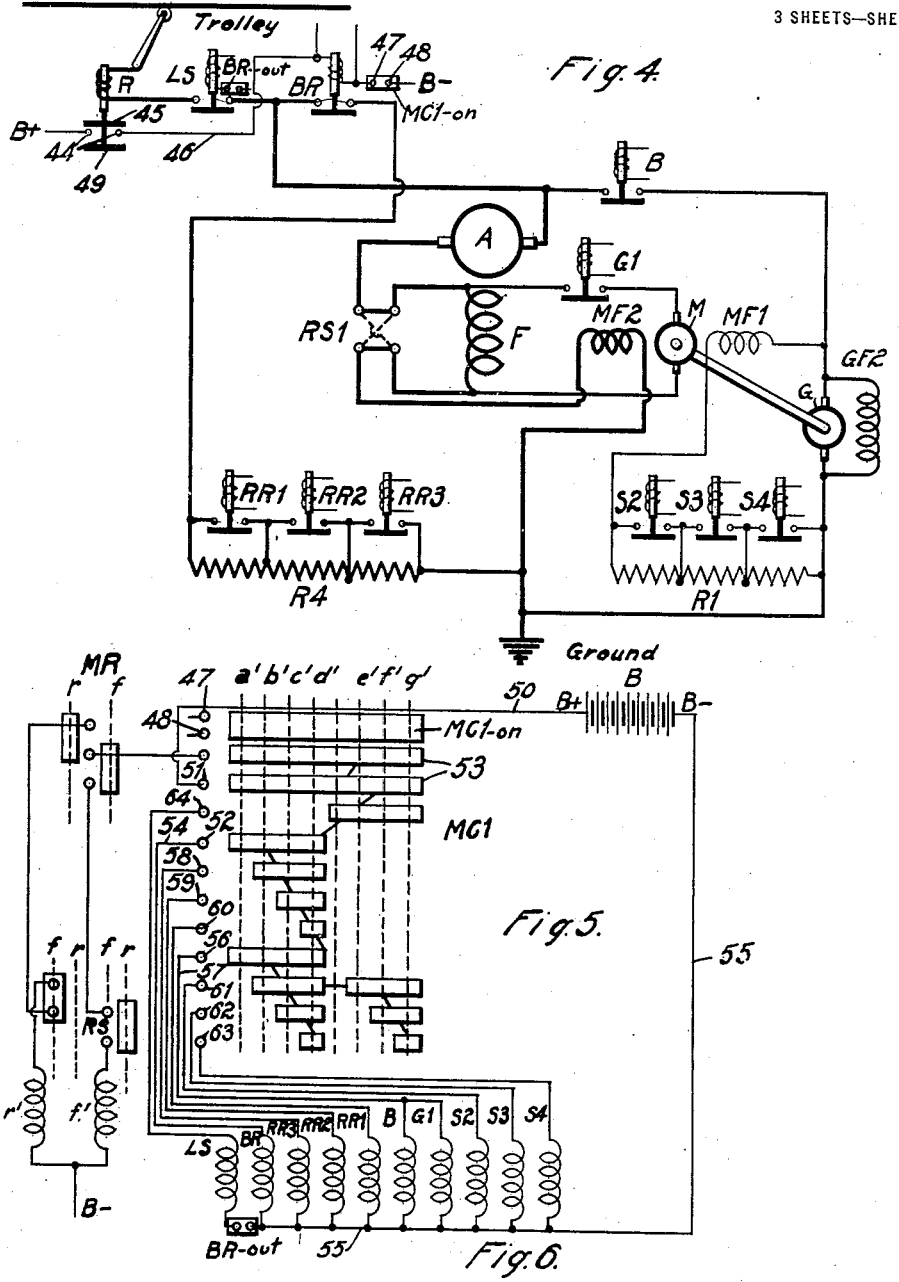

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,287,687.  Specification of Letters Patent.  Patented Dec. 17, 1918.

Application filed August 10, 1915. Serial No. 44,754.

*To all whom it may concern:*

Be it known that I, RUDOLF E. HELLMUND, a subject of the German Empire, and a resident of Pittsburgh, Pa., in the county of Allegheny and State of Pennsylvania, have invented a new and useful Improvement in Systems of Control, of which the following is a specification.

My invention relates to systems of control and it has special reference to the control of dynamo-electric machines that are adapted for regeneration and dynamic braking.

The object of my invention is to provide, in a system of the above-indicated character, simple and inexpensive means for automatically effecting dynamic-braking conditions upon the interruption of supply-circuit voltage during the regenerative period, whereby certain of the operating machines are prevented from reaching dangerously high speeds.

More specifically stated, it is the object of my invention to provide, in a system of the type employing a motor-generator during regeneration, switching means dependent upon supply-circuit conditions for automatically preventing over-speeding of the motor-driven vehicle and also of the motor-generator.

My invention may best be understood by reference to the accompanying drawings, wherein Figure 1 is a diagrammatic view of the main circuits of a system of control embodying my invention; Fig. 2 is a diagrammatic view of the auxiliary governing circuits for manipulating the various switches illustrated in Fig. 1 in accordance with the sequence chart of well-known form that is shown in Fig. 3; Fig. 2ª is a detail diagrammatic view of one of the circuit switches shown in Fig. 1; Figs. 4, 5 and 6 are views that correspond, respectively, to Figs. 1, 2 and 3, of a modification of my invention; Fig. 7 and Fig. 8 are simplified views showing accelerating and braking connections in the system of Fig. 1; and Fig. 9 is a simplified view of the braking connections of Fig. 4.

Referring to Fig. 1 of the drawings, the system shown comprises a plurality of suitable supply-circuit conductors respectively marked "Trolley" and "Ground"; a main dynamo-electric machine having an armature A and a series-connected field-magnet winding F; a reversing switch RS of a familiar electrically-controlled type, shown conventionally here, for reversing the electrical relations of the armature A and field winding F; an auxiliary motor-generator or dynamotor provided with armature windings M and G, shunt-connected field-magnet windings MF1 and GF1, and series-connected field-magnet windings MF2 and GF2, that are differentially connected with regard to the field windings MF1 and GF1, respectively; a plurality of main-circuit switches 1, 2, 3 and 8; a resistor R1 that is connected in circuit with the field winding MF1 and is adapted to be short-circuited in sections by switches 4 and 5; a second resistor R2 that is similarly associated with the field-magnet winding GF1 and is adapted to be short-circuited in sections by switches 6 and 7; a main-circuit resistor R3 that is adapted to be short-circuited in sections by switches 9 and 10; a second main-circuit resistor R4 that is adapted to be connected in circuit with certain of the above-mentioned machines during dynamic braking conditions; and a relay switching device R that is associated with the switches 1 and 11, in a manner to be described.

The armature M, field windings MF2 and GF2, and armature winding G of the motor-generator or dynamotor are connected in series-circuit relation in that order across the supply circuit, and the main dynamo-electric machine is connected between the negative conductor Ground and a point intermediate field windings MF2 and GF2.

The auxiliary governing system shown in Fig. 2 comprises the actuating coils for the various switches that are illustrated in Fig. 1; a master controller MC that is adapted to occupy a plurality of positions *a* to *e*, inclusive, when thrown in a direction that corresponds to acceleration of the main dynamo-electric machine, and to assume a plurality of operative positions *a'* to *f'*, inclusive, when thrown in the opposite direction which corresponds to regenerative operation; a master reverser MR, of a familiar type, that is associated with the main-circuit reversing switch RS in the usual manner; and a suitable source of energy, such as a battery B, for the actuating coils.

Assuming that the master reverser MR and the main reversing switch RS occupy their respective forward positions and that the master controller MC is actuated to its initial operative position *a*, the operation of the system, so far as acceleration is concerned, may be set forth as follows: A circuit is first established from the positive terminal B+ of the battery B, through conductor 20, control fingers 21 and 22, which are bridged by contact segment 23 of the master controller, conductor 24, the parallel-connected actuating coils of the switches 2 and 3, and conductor 25 to the negative terminal B— of the battery.

Another circuit is simultaneously established from the contact segment 23, through control finger 26, conductor 27, contact segment 28 of the master reverser, conductor 29, contact member 30 of the main reversing switch, conductors 31 and 32, control fingers 33 and 34, which are bridged by contact segment 35 of the master controller, conductor 36, the actuating coil of the switch 1, and the interlocking contact member 11—out, to the negative conductor 25.

A further circuit is established at this time from the contact segment 23, through control finger 22ª, conductor 24ª, and the actuating coil of the switch 8 to conductor 25.

Still another circuit is established from the contact segment 23, through control fingers 37 and 38, whence circuit is respectively completed through the actuating coils of the switches 4 and 5.

The main dynamo-electric machine is thus initially connected to the supply circuit, with the resistor R3 and the auxiliary armature M in circuit therewith, the field winding MF1 of the motor-generator or dynamotor being strongly energized by reason of the closure of switches 4 and 5, and the field-magnet winding GF1 being relatively weakly energized, inasmuch as the switches 6 and 7 are both open. Consequently, the armature winding M absorbs the greater part of the supply-circuit voltage, and only a relatively small electromotive force is impressed upon the terminals of the armature A, in accordance with the well-known action of the illustrated "booster" type of system.

When the master controller is moved to its position $b$, the actuating coil of the switch 4 is deënergized and a control finger 39 engages the contact segment 23, whereby the actuating coil of the switch 6 is energized.

In position $c$, the switch 5 is opened, and the switch 7 is closed by reason of the engagement of control finger 40 with the contact segment 23 of the master controller. In this way, the voltage of the armature M is gradually reduced to a relatively low value, whereas the voltages of the parallel-connected armature windings A and G are gradually increased to a relatively high value.

To effect further acceleration of the main machine, the switches 9 and 10 are closed in positions $d$ and $e$ of the master controller, by reason of the engagement of control fingers 41 and 42 with the contact segment 23.

Inasmuch as the particular control system employed for operating the main dynamo-electric machine during either acceleration or regeneration, is not material to my present invention, it is not believed that any further exposition of the acceleration of the main machine is necessary here. Such a system is fully shown and described in my co-pending application, Serial No. 39,375, filed July 12, 1915.

Assuming that conditions are suitable for regeneration of the main dynamo-electric machine, the main reversing switch RS is first thrown to its reversed position, in accordance with a well-known practice, and the master controller MC may then be actuated to its initial regenerative position $a'$.

A circuit is then established from the positive conductor 20, through the control fingers 21 and 22, contact segment 43 of the master controller, and the conductor 24 to the actuating coils of the switches 2 and 3, as hereinbefore described. The switches 1, 4 and 5 are also closed in a similar manner.

At this time, therefore, the armature winding M is relatively strongly energized by reason of the closure of the switches 4 and 5, the voltage of the armature M being raised to a value preferably slightly above the supply-circuit voltage, while the armature winding G is relatively weakly energized to induce a voltage in the armature winding A in the proper direction to assist regenerative operation.

Upon actuation of the master controller to its position $b'$, the actuating coil of the switch 8 is energized through the contact segment 43 of the master controller, whereby the main dynamo-electric machine is actively connected to the supply circuit to furnish regenerated energy thereto, inasmuch as the voltage of the armature M is preferably temporarily slightly above the supply-circuit voltage, as already stated.

Immediately upon connection of the main machine to the supply circuit, the series field-magnet windings MF2 and GF2 of the motor-generator or dynamotor dominate the differentially-connected field windings MF1 and GF1, respectively, and the voltage of the armature A is rapidly built up to a suitable value. The switches 4 and 5 are opened, in controller position $b'$, to simultaneously weaken the shunt field winding MF1, temporarily.

To regulate the regenerative operation of the main machine, the master controller may be moved to its position $c'$, wherein the switch 4 is closed to strengthen the energization of the field winding MF1. The switch 9 may also be closed at this time to short-circuit a section of the main-circuit resistor R3.

In position $d'$ of the master controller, switches 5 and 10 are closed, while, in positions $e'$ and $f'$, the switches 6 and 7 are successively closed. In this way, the voltage of the armature M is gradually increased from the relatively low voltage that obtained upon the connection of the main machine to the supply circuit, whereas the voltage of the armature G is gradually reduced, in accordance with the regenerated voltage of the armature A, which, of course, decreases as the speed of the main machine and of the associated railway or other vehicle decreases.

As already stated, the system above outlined forms no material part of my present invention and is more fully described in my above-identified co-pending application.

The emergency operation of the relay device R and its associated circuits will now be set forth. Assuming that the main machine is delivering regenerative energy to the supply circuit and that the supply-circuit voltage is temporarily interrupted, any one of the three following conditions may occur, and the relay device R is adapted to selectively act in the proper manner, in accordance with the particular condition that is to be met. In the first place, there may be no other railway vehicles operating upon the line at the instant of the interruption of supply-circuit voltage and, consequently, there is no means of absorbing the energy regenerated by the main machine. An equivalent case is the passage of the vehicle under a section insulator, whereby connection with the supply circuit is temporarily broken. In such cases, the relay device R will drop to its lower position, the braking resistor R4 will be connected in circuit to effect dynamic braking conditions, and the machines will be completely disconnected from the supply circuit, as set forth in detail later. In the second place, several railway vehicles may be operating from the supply circuit at the time of the voltage interruption, and, if the main dynamo-electric machine here illustrated were allowed to operate, it would attempt to furnish sufficient current to operate all of the vehicles, and, consequently, it would be seriously damaged. In such a case, the heavy current actuates the relay device R to its uppermost position, whereby the conditions already pointed out are effected. Thirdly, there may be but one railway vehicle operating upon the line at the time of the voltage interruption in question and, in such a case, it would do no harm for the main machine here illustrated to supply the necessary propulsion current to the said railway vehicle. In this case, the current traversing the actuating coil of the relay device R is insufficient to actuate the device to its uppermost position, although the current is sufficient to prevent the device from dropping to its lower position; consequently, the main machine is not disconnected from the supply circuit, and the braking resistor R4 remains inoperative, while the main machine supplies the necessary current to the above-mentioned single railway vehicle or its equivalent.

Referring now to the above-outlined circuits in detail, it will be observed that, when the relay device R drops to its lower position, a circuit is completed from the positive terminal B+ of the battery B, through the stationary and movable contact members 44 and 45, respectively, of the relay device, conductor 46, the actuating coil of the braking switch 11, and control fingers 47 and 48, which are bridged by contact segment MC— on of the master controller (best illustrated in Fig. 2), to the negative terminal B— of the battery. The switch 1 is immediately opened, upon the closure of the switch 11, by reason of the inclusion in the circuit of the actuating coil of switch 1 of the interlocking contact member 11-out that is shown in Fig. 2ª as associated with the switch 11, in accordance with a familiar construction. In the case of overload conditions, as mentioned in the second instance above, a movable contact member 49 of the relay device R bridges the stationary contact members 44 thereof, whereby the circuit changes already mentioned are effected.

It will thus be appreciated that overspeeding of the main dynamo-electric machine and the driven vehicle is prevented by reason of the dynamic braking effect that is set up, while the tendency of the motor-generator or dynamotor to reach a dangerous speed upon the loss of its shunt excitation on account of the interruption of supply-circuit voltage, is immediately checked by the continuance of the flow of current through its various field windings under dynamic braking conditions.

Whenever the regenerating machine is disconnected from the supply circuit by reason of the opening of switch 1 under the above mentioned "no-load" or "overload" conditions, regeneration may be again effected by first returning the master controller to its "off" position, thus causing the switch 11 to open and disconnect the braking resistor R4, and then actuating the controller through its operative regenerating positions, as previously described.

Reference may now be had to Fig. 4, wherein the system shown comprises the supply-circuit conductors Trolley and Ground; the main dynamo-electric machine having the armature A and the field winding F; the braking resistor R4 which is here shown as adapted to be short-circuited in sections by switches RR1 and RR2 and RR3; a motor-generator or dynamotor having one armature winding M connected across the field winding F of the main machine and having its other armature winding G connected to the supply circuit; a plurality of switches LS, B and G1; the relay device R; and a resistor R1, the sections of which are adapted to be respectively short-circuited by the switches S2, S3 and S4, that is connected in series-circuit relation with the field winding MF1 across the armature winding G.

In addition to the field winding MF1, the armature M is provided with field-magnet winding MF2 that is connected in series-circuit relation with the armature winding A, and armature winding G has a field-magnet winding GF2 connected across its terminals.

The auxiliary governing system shown in Fig. 5 comprises the actuating coils of the various switches that are shown in Fig. 4; a master controller MC1 that is adapted to occupy operative positions $a'$ to $g'$, inclusive, that correspond to regenerative operation of the main dynamo-electric machine; a master reverser MR that is associated, in a familiar manner, with the actuating coils of the main-circuit reversing switch RS1; and a suitable source of energy, such as battery B, for energizing the actuating coils.

For the sake of simplicity and clearness, only the regenerative operation of the system will be here described, and only the apparatus necessary for effecting such operation is shown.

Assuming that the main reversing switch RS1 has been actuated to its reverse position and that the master controller MC1 is moved to its initial position $a'$, the regenerative operation of the system may be described as follows: A circuit is first established from the positive terminal B+ of the battery B, through conductor 50, control fingers 51 and 52, which are bridged by contact segment 53 of the master controller, conductor 54, the actuating coil of the switch BR, and conductor 55, to the negative terminal B— of the battery B.

Another circuit is simultaneously established from the contact segment 53, through control finger 56, conductor 57, and the parallel-connected actuating coils of the switches B and G1 to the negative conductor 55. The armature winding M is thus connected across the main field winding F, the armature winding G is connected in parallel-circuit relation to the main machine, and the resistor R4 is also connected across the terminals of the main machine to inaugurate regenerative operation, as will be understood. To partially build up the voltage of the main armature A, the master controller may be moved to its position $b'$, whereupon control fingers 58 and 61 engage the contact segment 53 to effect the closure of the switches RR1 and S2.

In position $c'$ of the master controller, contact fingers 59 and 62 engage the contact segment 53, whereby switches RR2 and S3 are closed; and, when the master controller is moved to position $d'$, the contact segment 53 engages control fingers 60 and 63, whereby the actuating coils of the switches RR3 and S4 are energized.

In this way, the braking current through the resistor R4 is increased to produce a suitable voltage across the terminals of the armature A, the energization of the field winding F being suitably varied by reason of the manipulation of the switches S2, S3 and S4.

To connect the main machine to the supply circuit when conditions are suitable for regenerative operation, the master controller is moved to its position $e'$, whereby control finger 64 engages the contact segment 53, whence circuit is completed through the actuating coil of switch LS, interlock BR—out, and the negative conductor 55. At the same time, the switches RR1, RR2, RR3, S2, S3, S4 and the braking switch BR are opened by reason of the disengagement of the corresponding control fingers from the contact segment 53, and the main machine is thus connected to the supply circuit, with all of the resistor R1 actively in circuit with the field winding MF1.

To effect regulation of the regenerative operation as the vehicle speed decreases, the switches S2, S3 and S4 are successively closed as the master controller is moved through positions $e'$, $f'$ and $g'$, respectively, as will be understood.

It will be appreciated that the system just described is not material to my present invention and that it is shown simply as a modification of the system illustrated in Fig. 1 in order to set forth the applicability of the relay device R to various types of regenerative systems. The selective operation of the relay device R in connection with the system just described being exactly the same as that set forth in connection with Fig. 1, no exposition thereof is deemed necessary here.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a supply circuit, a main dynamo-electric machine and an auxiliary motor-generator associated with said main machine for regulating the voltage of the main machine, of a translating device, and means dependent upon predetermined conditions for disconnecting all of said machines from the supply circuit and for connecting said translating device in circuit to prevent predetermined abnormal operation of the machines.

2. In a system of control, the combination with a supply circuit, a main dynamo-electric machine and an auxiliary motor-generator associated with said main machine for regulating the voltage of the main machine, of a translating device, and means dependent upon predetermined supply-circuit conditions for disconnecting all of said machines from the supply circuit and for connecting said translating device across certain of said machines to prevent relatively high-speed conditions of all said machines.

3. In a system of control, the combination with a supply circuit, a main dynamo-electric machine and a motor-generator associated therewith to effect regenerative operation of the main machine, of a translating device, and a current-controlled switching device adapted, upon failure of supply circuit voltage, to effect the connection of said translating device in circuit with said machines.

4. In a system of control, the combination with a supply circuit, a main dynamo-electric machine and a motor-generator associated therewith to effect regenerative operation of the main machine, of a translating device, a switch for connecting said translating device across said machines, means dependent upon the main current for disconnecting the machines from the supply circuit and concurrently closing said switch under predetermined abnormal regenerative conditions and for permitting continued operation under normal regenerative conditions.

5. In a system of control, the combination with a supply circuit, a main dynamo-electric machine and a motor-generator associated therewith to effect regenerative operation of the main machine, of a translating device, a switch for connecting said translating device across said machines, and switching means dependent upon the main current for disconnecting the machines from the supply circuit and concurrently closing said switch under undesirable regenerative overload conditions and for permitting continued operation under normal regenerative load conditions.

6. In a system of control, the combination with a supply circuit, a main dynamo-electric machine and a motor-generator associated therewith to effect regenerative operation of the main machine, of a translating device, a switch for connecting said translating device across said machines, and switching means adapted upon an interruption of supply-circuit voltage to disconnect the machines from the supply circuit and concurrently close said switch to prevent an excessive overload upon the regenerating main machine, and also adapted upon such interruption to permit continued operation in case the regenerative load is below such overload.

7. In a system of control, the combination with a supply circuit, a main dynamo-electric machine and a motor-generator associated therewith to effect regenerative operation of the main machine, of a translating device, a switch for connecting said translating device across said machines, and switching means for selectively performing the following functions upon an interruption of supply-circuit voltage: disconnecting the machines from the supply circuit and closing said switch under either external no-load conditions, or predetermined external overload conditions for said main machine, upon the supply circuit, and permitting continued operation under normal external load conditions for said main machine upon the supply circuit.

8. In a system of control, the combination with a supply circuit, a main dynamo-electric machine, a motor generator having a plurality of armature and field windings connected in series relation across the supply circuit, and means for connecting said main machine to an intermediate point of the motor-generator circuit, of a translating device, means for effecting regenerative operation of the main machine, and means dependent upon main-circuit current conditions for disconnecting all of said machines from the supply circuit and for connecting said translating device across said machine and a portion of said motor-generator to prevent relatively high-speed conditions of the machines.

9. In a system of control, the combination with a supply circuit, a main dynamo-electric machine, a motor-generator having a plurality of armature and field windings connected in series relation across the supply circuit, and means for connecting said main machine to a point intermediate the armature winding of said motor-generator, of means for effecting regenerative operation of the main machine, a translating device across said machines, and switching means adapted upon an interruption of supply-circuit voltage to disconnect the machines from the supply circuit and concurrently close said switch to prevent an excessive overload upon the regenerating main machine, and also adapted, upon such interruption, to permit continued operation in case the regenerative load is below such overload.

10. In a system of control, the combination with a supply circuit, a main dynamo-electric machine having an armature and a series field-magnet winding, a motor-generator having one armature winding connected to said supply circuit and having the other armature winding connected across said main field winding, of a translating device, means associated with said translating device for inaugurating regenerative operation, and means dependent upon predetermined abnormal supply-circuit conditions for disconnecting all of said machines from the supply circuit and for connecting said translating device across certain of said machines.

11. In a system of control, the combination with a supply circuit, a main dynamo-electric machine having an armature and a series field-magnet winding, a motor-generator having one armature winding connected to said supply circuit and having the other armature winding connected across said main field winding, of a translating device, a switch associated therewith for inaugurating regenerative operation, and switching means adapted, upon an interruption of supply-circuit voltage, to disconnect the machines from the supply circuit and concurrently close said switch to prevent an excessive overload upon the regenerating main machine, and also adapted, upon such interruption, to permit continued operation in case the regenerative load is below such overload.

12. In a system of control, the combination with a supply circuit, a dynamo-electric machine and an auxiliary source of energy connected in predetermined circuit relation with said machine to effect regenerative operation of the machine, of a translating device, and means dependent upon certain system conditions for replacing the supply circuit by said translating device.

13. In a system of control, the combination with a supply circuit, a dynamo-electric machine and an auxiliary source of energy connected in predetermined circuit relation with said machine in order to effect regenerative operation of the machine, of a translating device, and means dependent upon an interruption of supply-circuit voltage for disconnecting said machine and said source from the supply circuit and for connecting said translating device in circuit to prevent abnormal operation of said machine and said source.

14. In a system of control, the combination with a supply circuit, a dynamo-electric machine and a voltage-converting apparatus associated therewith to effect regenerative operation of the machine, of a resistor, and a switching device adapted, upon interruption of supply-circuit voltage, to effect the connection of said resistor in circuit with said machine.

15. In a system of control, the combination with a supply circuit, a dynamo-electric machine and an auxiliary source of energy associated therewith to effect regenerative operation of the machine, of a translating device, means for connecting said translating device in circuit with said machine, and means dependent upon the machine current for disconnecting the machine from the supply circuit and concurrently closing said connecting means under predetermined regenerative conditions and for permitting continued operation under other predetermined regenerative conditions.

In testimony whereof, I have hereunto subscribed my name this 31st day of July, 1915.

RUDOLF E. HELLMUND.